(12) United States Patent
Colleoni et al.

(10) Patent No.: US 10,584,013 B2
(45) Date of Patent: Mar. 10, 2020

(54) UNIT FOR WINDING AND UNWINDING CABLES OF A CABLE-LAYING MACHINE

(71) Applicant: TESMEC S.P.A., Milan (IT)

(72) Inventors: Matteo Colleoni, Ponte San Pietro (IT); Fabrizio Parodi, Valbrembo (IT)

(73) Assignee: TESMEC S.P.A., Milan (IT)

( * ) Notice: Subject to any disclaimer, the term of this patent is extended or adjusted under 35 U.S.C. 154(b) by 23 days.

(21) Appl. No.: 15/772,467

(22) PCT Filed: Oct. 27, 2016

(86) PCT No.: PCT/EP2016/075922
§ 371 (c)(1),
(2) Date: Apr. 30, 2018

(87) PCT Pub. No.: WO2017/072226
PCT Pub. Date: May 4, 2017

(65) Prior Publication Data
US 2018/0282109 A1     Oct. 4, 2018

(30) Foreign Application Priority Data
Oct. 30, 2015   (IT) .................. 102015000067564

(51) Int. Cl.
*H02G 1/04* (2006.01)
*B65H 75/44* (2006.01)
(Continued)

(52) U.S. Cl.
CPC ..... *B65H 75/4442* (2013.01); *B65H 75/4489* (2013.01); *H02G 1/04* (2013.01);
(Continued)

(58) Field of Classification Search
CPC ............ B65H 75/4442; B65H 75/4489; H02G 11/02; H02G 1/04; H02G 1/06
See application file for complete search history.

(56) References Cited

U.S. PATENT DOCUMENTS 3,396,747 A * 8/1968 Moore .................... B63C 11/52
                                                        137/355.21
3,910,497 A * 10/1975 Manor .................. B05B 9/0403
                                                        239/127

(Continued)

OTHER PUBLICATIONS

International Search Report from PCT/EP2016/075922 dated Jan. 23, 2017 (3 pages).

*Primary Examiner* — Sang K Kim
(74) *Attorney, Agent, or Firm* — Calfee Halter & Griswold LLP

(57) ABSTRACT

Unit for winding and unwinding cables of a cable-laying apparatus, comprising a reel to support the cables to be wound or unwound, a support frame configured to keep said reel in a raised position with respect to the ground, and a rotation shaft solid with the reel and associated with a corresponding hydraulic drive unit; the unit also comprises at least a dynamic braking device associated with the rotation shaft and configured to allow, according to a first operating mode, the normal rotation of the shaft and therefore of the reel for winding or unwinding the cables, and to exert on the shaft and therefore on the reel, according to another operating mode, a dynamic braking condition that allows the shaft to rotate in a braked configuration for at least a certain period of time and prevents the instantaneous stoppage of the rotation of the reel.

10 Claims, 4 Drawing Sheets

(51) Int. Cl.
*H02G 1/06* (2006.01)
*H02G 11/02* (2006.01)
*B60M 1/28* (2006.01)

(52) U.S. Cl.
CPC .............. *H02G 1/06* (2013.01); *H02G 11/02* (2013.01); *B60M 1/28* (2013.01); *B65H 2701/32* (2013.01)

(56) References Cited

U.S. PATENT DOCUMENTS

| | | | |
|---|---|---|---|
| 4,213,596 A | | 7/1980 | Inoue et al. |
| 4,508,281 A | * | 4/1985 | Plater .................. B65H 59/381 242/390.6 |
| 4,576,337 A | * | 3/1986 | Post .................. B65H 75/4489 137/355.12 |
| 5,531,246 A | * | 7/1996 | Ritter .................. B65H 75/425 137/355.16 |
| 5,636,648 A | * | 6/1997 | O'Brien .................. B08B 9/04 134/107 |
| 9,206,658 B1 | * | 12/2015 | Dion ........................ E21B 19/22 |
| 2005/0089374 A1 | | 4/2005 | Belluschi |
| 2015/0292282 A1 | * | 10/2015 | Dyck .................. E21B 19/008 166/385 |
| 2018/0316165 A1 | * | 11/2018 | Colleoni .................. B60M 1/28 |

* cited by examiner

UNIT FOR WINDING AND UNWINDING CABLES OF A CABLE-LAYING MACHINE

CROSS-REFERENCE TO RELATED APPLICATION

This application is the U.S. national phase entry of PCT/EP2016/075922, with an international filing date of 27 Oct. 2016, which claims the benefit of Italian Application Serial No. 102015000067564, with a filing date of 30 Oct. 2015, the entire disclosures of which are fully incorporated herein by reference.

FIELD OF THE INVENTION

The present invention concerns a unit for winding and unwinding cables for cable-laying machines or apparatuses, for example the cables of a high-voltage aerial electric line, or a railway contact line or other, and in general aerial lines that provide a so-called "braked" laying of the cables.

BACKGROUND OF THE INVENTION

It is known that the traditional system for laying an electric line provides a so-called "braked" laying, using machines with multiple capstans: a winch machine, which recovers a steel cable with a drawing function, and a braking machine, which applies a controlled tension on the wires during the laying step, so as to guarantee they can remain suspended to the guide devices provided on the intermediate supports, so as not to slide on the ground or against obstacles present under the wires, such as road or rail crossings, intersections with other electric lines and so on. Moreover, it is more and more common to use a helicopter to draw the pilot cable from the brake station to the winch station, or sometimes even to draw the final wire, thus eliminating the winch machine in this operation.

The same concepts are applied to aerial laying of guard cables with optical fiber cores (OPGW) or without optical fiber cores (GW).

The technology of braked laying is also applied in laying the electric overhead contact lines for railway traction, with the difference that the braking machine is mounted on a translating wagon, whether self-propelling or drawn, and thanks to the movement of the wagon the brake releases the contact cable or the suspension cable at a controlled tension.

The wires unwound and braked by the braking machines come from reels, where they are wound during the production step. During the laying step the reels are supported by cable winding and unwinding units, called reel-bearing trestles. The trestles are normally equipped with positive action disc brakes, so can be adjusted from the outside, and/or with hydraulic drive of the braking system, normally by means of a kinematic chain consisting of a hydraulic motor, brake and gear transmission, or mechanical reduction gear. This is because the wire branch comprised between reel and capstans of the braking machine must be kept braked at a reference value, normally comprised between about 150 and 250 kg, so as to guarantee the so-called "counter-traction" needed to generate friction of the wire on the pair of capstans, and hence to keep the wire under tension, at the value of the laying traction, once it has come out from the capstans of the braking machine.

Traditional braked laying machines are known to be equipped with an automatic drive mechanical safety device called negative brake, the purpose of which is to hold the load of the wire or cable laid, both when the machine is stationary, that is, when it is not fed, and also in emergency situations, for example due to a malfunction in the circuit.

The negative brake is intended to hold a load in static conditions, not to function as a traditional brake, that is, with a progressive braking maintained under dynamic conditions. If the applied braking limit is exceeded, this causes a relative rotation of the fixed and mobile elements of said device, which after a certain time creates overheating and accelerated wear of the friction elements, precisely because the negative brake is not intended to work under dynamic conditions.

Traditional winch machines for braked laying are also normally equipped with two devices to limit and control the overload, which if used correctly can prevent situations of serious overloading along the path of the cables laid.

Using a mean other than traditional winch laying machines to perform the traction and/or translation operations, as in the case of the railway wagon or helicopter, means that a possible sudden stoppage of the braking machine, even if due to extraordinary causes, causes the negative brake to close, which is the automatic drive safety device to hold the load. This closure of the negative brake generates a recoil on the translating mean, not necessarily synchronized with the braking machine or having a long stoppage time with respect to the instantaneous closure of the negative brake, and a consequent overload on the stretched cable, which can lead to damage and even breakage of the cable, with obvious risks to the safety of the operators and risks of great damage to everything that is under the cable. Therefore, in practice, this recoil neutralizes the safety function for which the negative brake is supplied. If a helicopter is used, the recoil of the cable could even lead to the instability of the aircraft, with obvious serious consequences.

The same can be said in the event of a sudden stoppage of the winding/unwinding machine connected to the braking machine, on which the cable to be laid is positioned and which must supply the correct tension (called counter-traction) to the wire, which is needed to generate the friction of the wire on the pair of capstans.

If the braking machine stops, a normal traction regulation valve present in known systems, with a hydraulic or electric piloted command, moves to a position of maximum opening, that is, minimum pressure of the regulation field, once the piloting stops, so that traditional systems with an accumulator to keep the negative brake open lose their effectiveness, because the tension on the cable or wire is no longer controlled.

From the Italian patent n. 0001414902 a safety plant is known for a cable-laying machine which is provided with a motorized drive device connected to the valve to regulate the traction or maximum pressure of the plant, and having the function of keeping the traction set where other devices prevent the automatic closure of the negative brake, hence limiting the recoil and keeping the main valve for regulating the traction under pressure, with the final result of keeping the wire under tension and preventing it from falling to the ground. The plant described in this patent therefore acts on controlling the traction applied to the machine.

However, this plant does not behave in the best way nor is it perfectly effective in particular situations of the machine, such as for example malfunctions or other anomalies that can occur in the work cycle of the machine, such as malfunctions of the electric, electronic, hydraulic type, or motor breakdowns. Moreover, the plant is not optimal from the point of view of safety, and does not intervene on external devices like the support trestle for the reels of the laying machine.

The unit for winding and unwinding cables, or reel-carrier trestle, can also be provided with its own negative brake, which is generally a negative lamellar brake in an oil bath. The brake acts under the thrust of a series of springs on pairs of alternate discs, fixed and mobile. The brake is released due to the effect of the hydraulic pressure in the piston of the negative brake. Negative lamellar brakes in an oil bath are used for so-called static braking or as normal parking brakes. In substance, using said brakes, the unit for winding and unwinding cables, in the event of malfunctions, is stopped suddenly, entailing both safety risks with regard to operators, and also risks of damage to the equipment of the laying apparatus.

One purpose of the present invention is therefore to obtain a unit for winding and unwinding cables for cable-laying machines which is provided with a braking device that does not stop the machine suddenly and is able to guarantee a minimum braking in a dynamic condition, which therefore allows to continue and/or complete the laying operations according to a suitable logic and intervention procedure, before the unit for winding and unwinding cables is safely stopped.

Another purpose of the present invention is to obtain a unit for winding and unwinding cables for cable-laying machines which is provided with a dynamic braking device that does not overheat and which is long-lasting.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a unit for winding and unwinding cables of a cable-laying apparatus, comprises a reel to support the cables to be wound or unwound, a support frame configured to keep the reel in a raised position with respect to the ground, and a rotation shaft solid with the reel and associated with a corresponding hydraulic drive unit.

According to one aspect of the invention, the unit for winding and unwinding cables comprises at least a dynamic braking device associated with the rotation shaft and configured to allow, according to a first operating mode, the normal rotation of the shaft and therefore of the reel for winding or unwinding the cables, and to exert on the shaft and therefore on the reel, according to another operating mode, a dynamic braking condition that allows the shaft to rotate in a braked configuration for at least a certain period of time and prevents the instantaneous stoppage of the rotation of the reel.

Advantageously, by means of the dynamic braking device with which the present unit for winding and unwinding cables is provided, and which guarantees, in an operating mode, a minimum braking, it is possible to slow down and then the stop the rotation of the reel around which the cable is wound, in a controlled manner, without needing to stop it abruptly and cause dangerous recoils, which can have serious consequences for the operators and the equipment of the cable-laying apparatus in which the unit for winding and unwinding cables is used.

The present invention also concerns a method to stop safely a cable winding and unwinding unit, comprising a support reel of the cables to be wound or unwound, a support frame configured to keep the reel in a position raised with respect to the ground and a rotation shaft solid with the reel and associated with a corresponding hydraulic drive unit.

According to one aspect of the invention, if there is a hydraulic breakdown of the hydraulic drive unit, the present method provides a step of controlled stoppage of the winding and unwinding unit by means of a dynamic braking exerted on the reel, able to generate a counter-traction force on the cable for a determinate period of time, so that for this period of time the reel continues to rotate in a dynamically braked manner.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
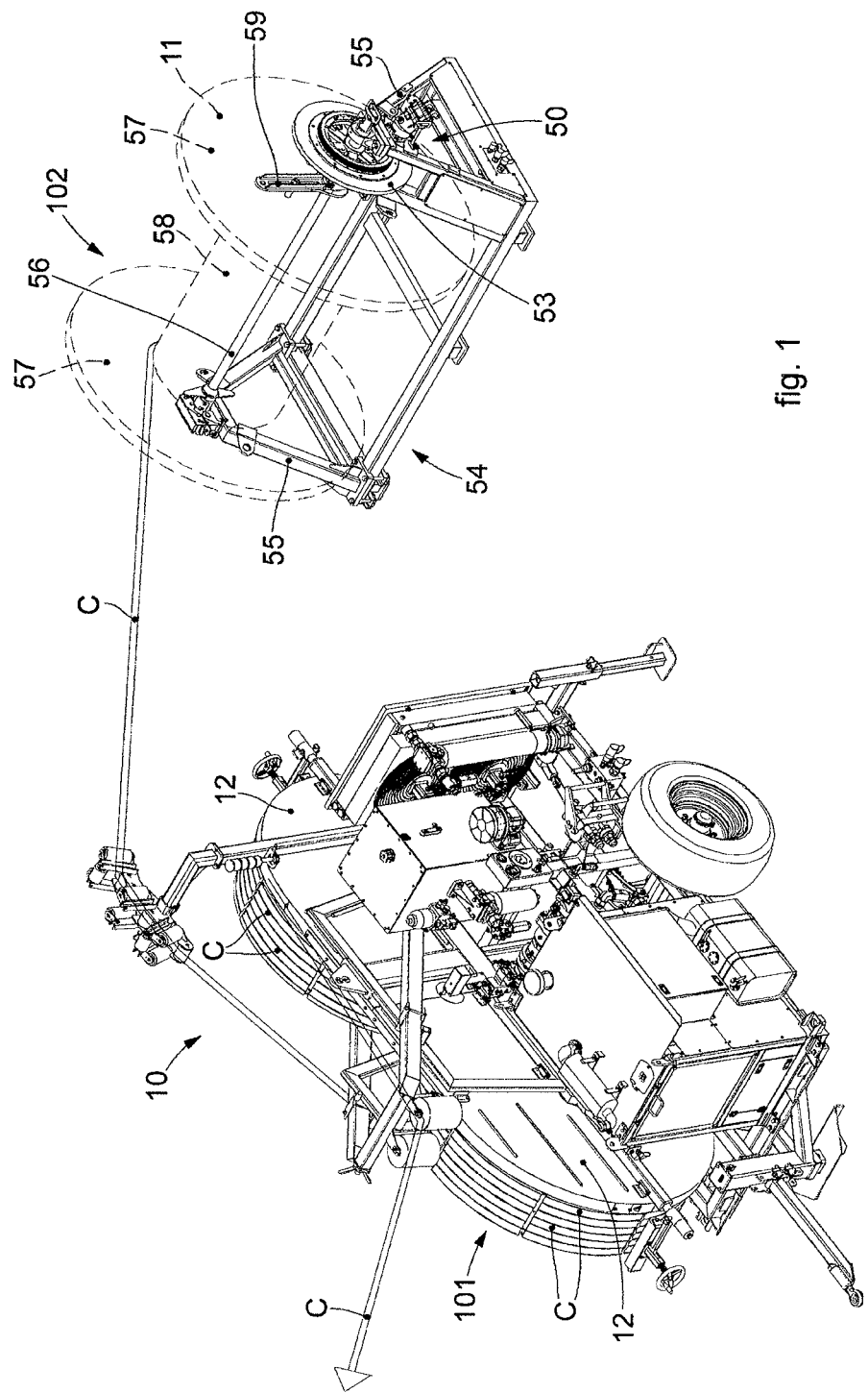
FIG. 1 is a perspective view of a cable-laying apparatus provided with a unit for winding and unwinding cables according to the present invention.

FIG. 1 of the attached drawings shows an apparatus 10 for laying cables, comprising a work unit 101, provided with capstans 12 onto which the cables C to be laid are wound, for example a pair of capstans 12. The cables C are rewound or released in a winding and unwinding unit 102 according to the present invention, comprising a reel 11, around which the cable C is wound/unwound and comprising a dynamic braking device 50 of the reel 11. The dynamic braking device 50 can be provided with a disc 53 and a negative brake caliper 49, visible in the following drawings. The winding and unwinding unit 102 of the reel 11 of cable C to be unwound is normally called winding trestle or reel-carrier trestle. If the laying apparatus 10 works as a brake, the task of the work unit 101 is to guarantee the tension or counter-traction on the cables C between the rewinder and pair of capstans 12: the counter-traction is necessary to guarantee the friction between the grooves of the capstans and the wire that leads to the final tension in the cable C exiting from the capstans.

The winding and unwinding unit 102 comprises a frame 54 configured to keep the reel 11 raised with respect to the ground. The support frame 54 can be made of steel, for example, and can have an adjustable height from the ground and adjustable width, depending on the sizes of the reel 11 to be supported. The frame 54 can also be provided with systems which allow it to be anchored to the ground. The frame 54 comprises laterally a pair of uprights 55, on which are housed support bearings for a rotation shaft 56. The reel 11 comprises a central core 58, for example a hollow cylindrical core, and two lateral wings 57, for example circular. The lateral wings 57 are integrated with the shaft 56 by suitable anchoring elements 59, such as radial rods, cross-pieces or suchlike. The shaft 56 protrudes for a certain segment outside the two uprights 55 and is positioned, when assembly is complete, inside the central core 58 of the reel 11. The disc 53 of the dynamic braking device 50 is connected to the shaft 56, so that the disc 53 is integrated with the shaft 56 and the reel 11.

Figure 2:
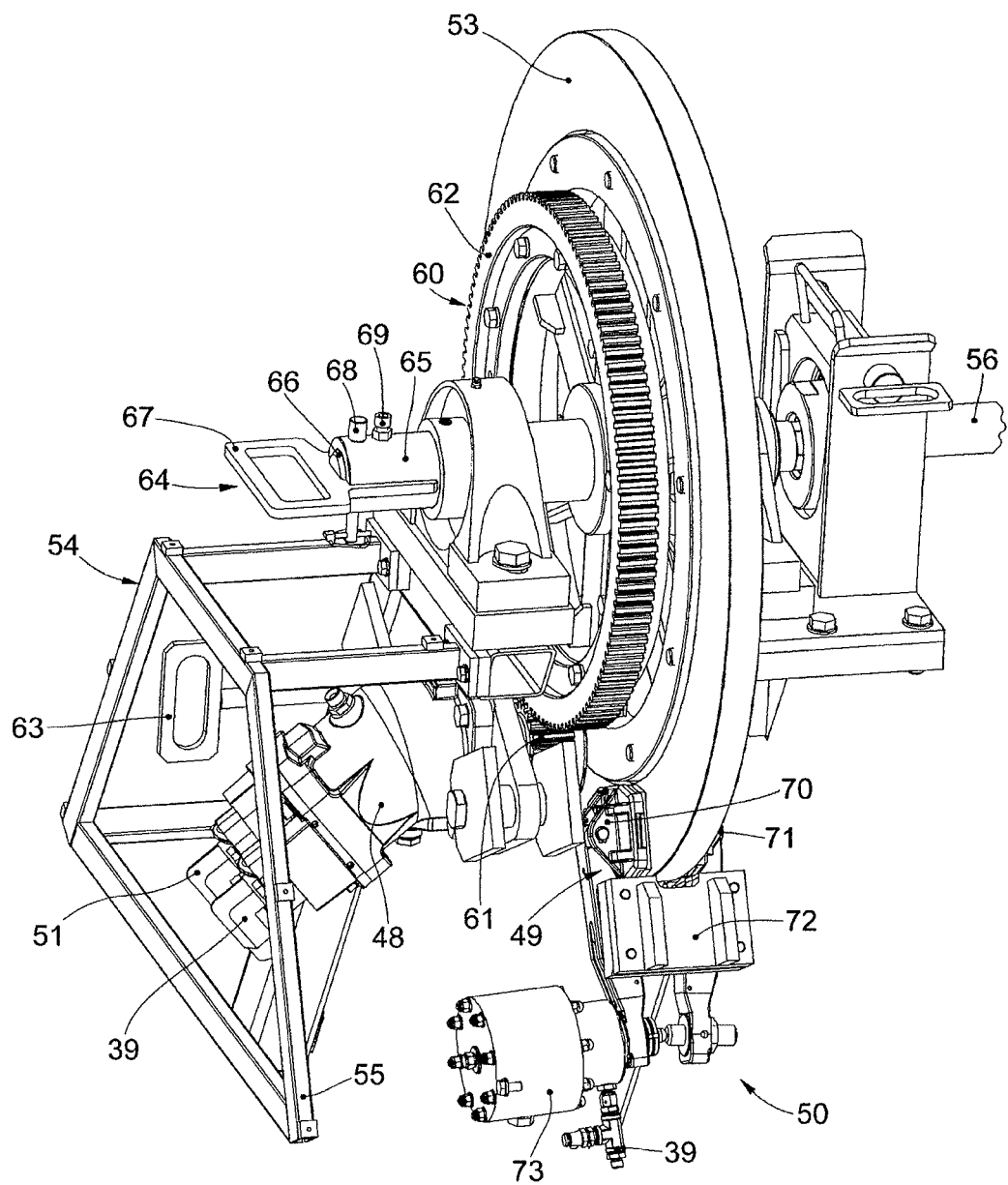
FIG. 2 is a partial perspective view and on an enlarged scale of the present unit for winding and unwinding cables, considered in correspondence with a dynamic braking device of the present unit.

FIG. 2 shows on an enlarged scale the part of the winding and unwinding unit 102 in which the dynamic braking device 50 is positioned. The winding and unwinding unit 102 is provided with a hydraulic motor 48 to transmit motion to the shaft 56 and hence to the reel 11. The hydraulic motor 48 is associated with a transmission unit 60 comprising for example a pinion 61 connected to a hydraulic motor 48 to drive the shaft 56 and a crown 62 integrated with the shaft 56. The hydraulic motor 48 and the transmission unit 60 therefore represent, substantially, a hydraulic drive unit of the shaft 56 and hence of the reel 11. The hydraulic motor 48 is connected to two branches 39 and 51 of an adjustment and safety hydraulic circuit 30 of the laying apparatus 10, shown in FIGS. 3 and 4. The transmission unit 60 and the hydraulic motor 48 are mounted on the support frame 54 of the unit 102. The hydraulic motor 48 and the pinion 61 can be separated from the crown 62 by means of a handle 63, so as to facilitate possible maintenance operations or, for example, to replace the motor. The hydraulic motor 48 and the transmission unit 60 are associated with the shaft 56 by means of a coupling device 64 provided with a cylindrical support 65 inside which a shaft 66 is housed, provided at the end with a handle 67 able to allow a translation of the shaft 66 inside and outside said support 65 for a predefined travel. FIG. 2 shows the shaft 66 completely inserted in the support 65 and then coupled on the support and rotation shaft 56 of the reel. The connection of the shaft 66 of the coupling device 64 with the support shaft 56 of the reel can take place for example by providing that the shaft 66 is provided, at the opposite end to that where the handle 67 is provided, not visible in the drawing, with a polygonal part, for example a hexagonal head, configured to couple with a corresponding polygonal part, for example a hexagonal seating, of the shaft 56. The coupling device 64 is also provided with pins 68 and 69 to clamp the shaft 66 in position. The pins 68 and 69 will pass through corresponding through holes made in the support 65 and will be inserted in suitable seatings made on the surface of the shaft 66.

The disc 53 of the dynamic braking device 50 is integrated with the crown 62 of the transmission unit 60. Moreover, the disc 53 is sized so as to support the load and the heat generated by the friction due to the closure of the negative brake caliper 49. The negative brake caliper 49 comprises a pair of jaws 70 and 71 provided with a corresponding support 72. The jaws 70 and 71 are driven by a corresponding actuator 73, for example a hydraulic actuator, able to vary their reciprocal distance, hence able to keep them at a certain distance from the disc 53 or to keep them in contact with the disc 53, according to a desired contact pressure and hence a desired braking force. The actuator 73 and the negative brake caliper 49 provide attachment supports to the frame 54 of the unit 102. The jaws 70 and 71 will be equipped with suitable brake pads, made so as to create the necessary friction to guarantee the counter-traction force and to dissipate the heat deriving from the pressure and speed of rotation of the disc 53. Inside the actuator 73 calibrated springs are housed, which in the event that there is a lack of pressure of the hydraulic circuit 30, shown in the following drawings, in any case close the jaws 70 and 71 with a force that depends on the type of spring provided during the design step. The calibrated springs could be replaced by other elastic return elements suitable to be calibrated so as to exert a certain closing force of the jaws 70 and 71 of the negative brake caliper 49. The actuator 73 is then set, through the calibrated springs, so as to guarantee that the jaws 70 and 71 always exert a counter-traction force, even in the event of breakdowns or malfunctions in the hydraulic circuit 30. The counter-traction force, preferably constant, is exerted for a certain period of time before the unit 102 is stopped, therefore guaranteeing a dynamic braking condition. The actuator 73 is also connected to the same branch 39 of the hydraulic circuit 30 that feeds the hydraulic motor 48.

This value of the counter-traction force will assume variable values depending on a series of parameters, such as for example the type of operations to be performed with the laying apparatus, the type of wire or cable, the sizes of the reels and others. Preferably, the value of the counter-traction force during dynamic braking can vary from about 10% to about 40% of the maximum traction force exerted by the apparatus when functioning in brake mode, so as to always guarantee a correct dynamic braking.

We will now look at two non-restrictive examples of how the winding and unwinding unit 102 according to the present invention operates, cooperating with the work unit 101 of the laying apparatus 10, in the case where the laying apparatus 10 functions as a brake. In general, in FIGS. 3 and 4, the segments of the hydraulic circuit shown with lines of greater thickness and provided with arrows are the branches of the hydraulic circuit 30 where the work fluid is present.

A series of operating units of the cable-laying apparatus 10 are connected to the hydraulic circuit 30: a first power transmission unit 210; a second motorized braking unit 310; a third command unit 410 of a safety device 13, for example a negative brake, of the first power transmission unit 210; a fourth unit 510 to regulate the winding and unwinding unit 102; and a fifth conditioning unit 610. In addition to the operating units described above, a command unit is also provided, not shown, on board the work unit 101, shown substantially by the first five operating units from 210 to 610.

The safety device 13, as stated above, could be a negative brake, but also a positive brake, a mechanical brake or other.

The safety device 13 is able to operate automatically in case of a breakdown on the hydraulic circuit 30.

The power transmission unit 210 comprises the safety device 13, hydraulically drivable and which allows to block the rotation of the pair of capstans 12. The safety device 13 is located on a reduction unit, not visible in the drawings, which transmits motion to the capstans 12. The power transmission unit 210 of the cable-laying apparatus 10 comprises a hydraulic motor 14, preferably with variable engine size, which when the apparatus is functioning as a brake, can be made to rotate by the pair of capstans 12, thus operating as a hydraulic pump to keep the cables under tension during normal laying operations. The hydraulic motor 14 picks up and discharges the work fluid from a suitable containing tank 15, common to the other operating units from 210 to 610. The power transmission unit 210 comprises a main pump 16 and an auxiliary unit 17 provided with two pumps 18 and 19. The main pump 16 and the pumps 18 and 19 of the auxiliary unit 17 are driven by a motor 20, for example a diesel motor. The main pump 16 is connected to the hydraulic motor 14 by means of a first branch 22 of the hydraulic circuit 30 in which a distributor valve 21 is positioned, in particular, for example, a proportional valve regulated by a corresponding electric motor, not shown. A second branch 23 of the hydraulic circuit 30 connects the hydraulic motor 14 to the tank 15 that contains the work fluid, through the proportional valve 21, while in an offshoot of the branch 23 of the hydraulic circuit a non-return valve 24 is provided. The branch 25 of the hydraulic circuit 30 connected to the main pump 16 is divided into a connection segment with the proportional valve 21 and into a connection segment with the safety valve 26.

In the second motorized braking unit 310, also connected with the hydraulic circuit 30, a motorized braking valve 27 is positioned, and also a braking reduction valve 28, in particular a manual valve, which substantially reduces the intensity of the tension on the cable/cables C, discharging the work fluid into the tank 15.

The third command unit 410 of the safety device 13 comprises an accumulator 29 of the work liquid connected by a branch 31 of the hydraulic circuit 30 to one of the two auxiliary pumps, for example pump 18. Downstream of the pump 18 a first non-return valve 32 is provided, while upstream of the accumulator 29 another non-return valve 33 is provided. The third unit 410 comprises a first distributor valve 34 of the safety device 13 and a second distributor valve 35 of the winch. The valves 34 and 35 are preferably electro valves with a mechanical stop, that is to say, when the command that determines the commutation of the valve in a certain position has stopped, the valve remains in the position where it is. The valves 34 and 35 are connected to the branch 31 of the adjustment and safety hydraulic circuit 30 and to a branch 36 of the hydraulic circuit 30 which is connected to the power transmission unit 210, and in particular to the safety device 13 and the laying apparatus 10.

The unit 510 to regulate the winding and unwinding unit 102 comprises a device 37 to block the suction of the winding and unwinding unit 102 and a motorized counter-traction valve 38 of the cables C. The unit 510 also provides a branch 39 of the hydraulic circuit 30 to connect with one of the auxiliary pumps, for example pump 18.

The conditioning unit 610 comprises a radiator 40 connected, by means of a branch 41 of the hydraulic circuit 30, on one side to the tank 15 of work fluid through a filter 42 and a non-return valve 43, and on the other side to the branch of the hydraulic circuit 30 where the motorized braking valve 27 and the counter-traction valve 38 are positioned. The radiator 40 is also connected, by means of another branch 44 of the hydraulic circuit 30, to one of the two auxiliary pumps, for example auxiliary pump 19. The branch 44 of the hydraulic circuit 30 comprises a valve 45 to distribute the work fluid to the radiator 40 and a safety valve 46. The distributor valve 45 is preferably an electro valve. Downstream of the auxiliary pump 19 another non-return valve 47 is provided.

The winding and unwinding unit 102 is shown schematized in the hydraulic circuit 30 by means of the hydraulic motor 48 of the unit 102 and the negative brake caliper 49 of the dynamic braking device 50. The hydraulic motor 48, as we have seen, is connected on one side to the branch 39 of the hydraulic circuit 30 connecting to the auxiliary pump 18, and on the other side to another branch 51 of the hydraulic circuit 30 connecting to the tank 15. In this branch 51 of the hydraulic circuit 30 the device 37 to block the suction is positioned.

The adjustment and safety hydraulic circuit 30 and the various operating units will be managed by a control unit, not shown in the drawings for reasons of clarity, which will be connected electrically to the various elements of the hydraulic circuit 30, such as for example the various electro valves, the diesel motor, the hydraulic motor, the pumps, brakes, pressure detectors and flow rate detectors that the circuit is provided with, and others. The control unit will be managed by a control panel located remote from the laying apparatus 10, which will comprise, as we said, a command unit on board the machine. By means of the control unit and the remote panel, it will therefore be possible to set all the operating parameters of the apparatus 10, for example the working pressures of the work fluid, the maximum working pressure and other.

Figure 3:
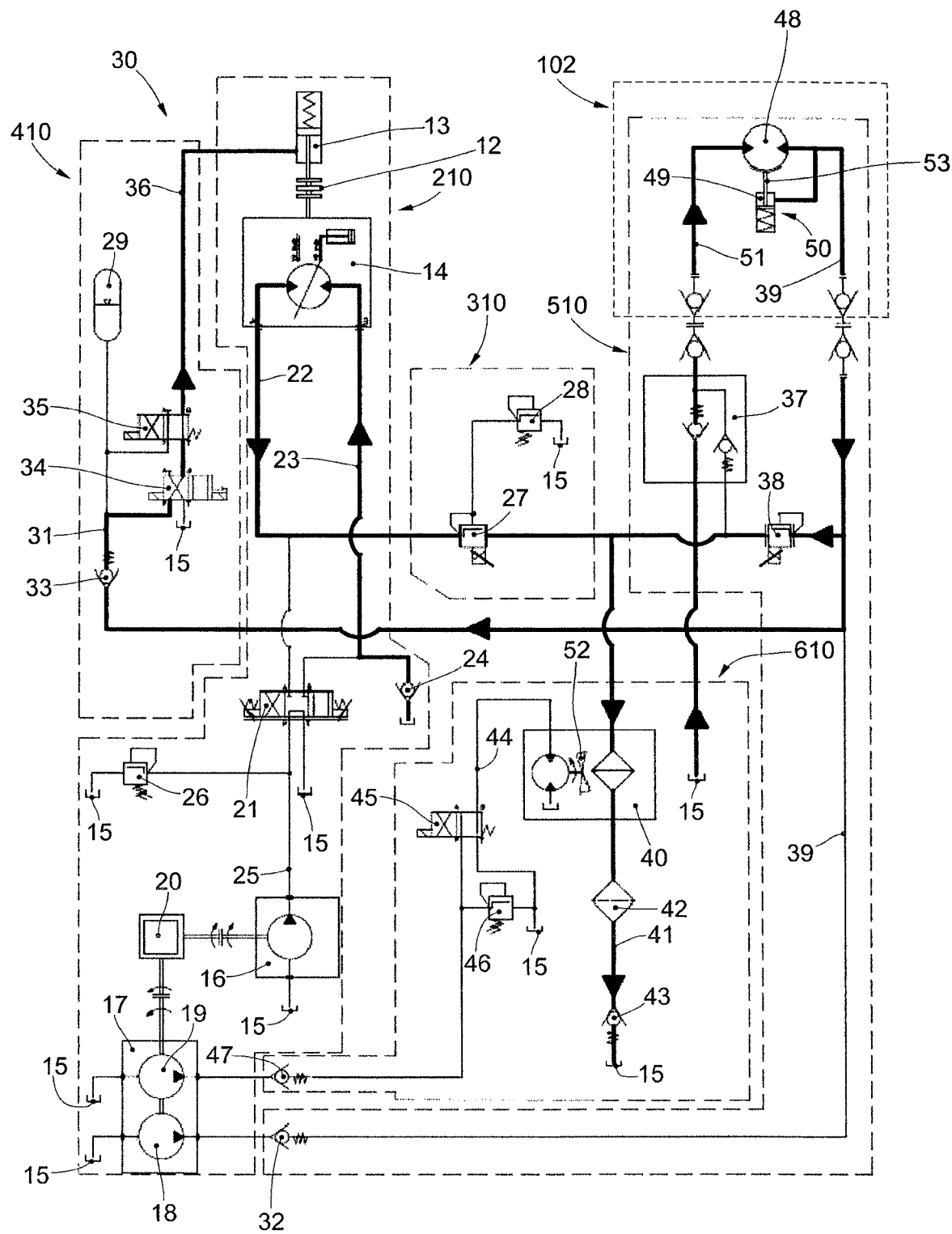
FIG. 3 is a schematic representation of a control and safety hydraulic circuit of the cable-laying apparatus in a normal operating condition functioning as a brake.

In the normal functioning of the laying apparatus 10 as a brake, FIG. 3, the hydraulic motor 14 works as a hydraulic pump, the distributor valve 34 of the safety device 13 is switched on opening so as to open the safety device 13 located on the reduction unit that transfers motion to the capstans 12. The braking intensity of the apparatus 10 is set by regulating the motorized braking valve 27 of the motorized braking unit 310. The negative brake caliper 49 of the dynamic braking device 50 of the winding and unwinding unit 102 in this case is open, so the reel 11 in FIG. 1 can rotate freely to rewind the cable C. The negative brake caliper 49 of the dynamic braking device 50 is allowed to open by the passage of work fluid in the branches 51 and 39 of the hydraulic circuit 30 and by the pressure generated by the motorized regulation valve 38. In this mode the proportional valve 21 is switched to a closed position to prevent sending of the work fluid to the hydraulic motor 14. In practice, by means of the command signal arriving from the work unit 101, the motorized regulation valve 38 is commanded so as to increase the pressure in the branch 39 of the hydraulic circuit 30 to a minimum opening value of the negative brake caliper 49. The jaws 70 and 71 of the negative brake caliper 49 open, allowing the hydraulic motor 48 to generate the necessary counter-traction force set in the design stage for the correct performance of the operations for laying the cable C. If it is desired to increase the value of the counter-traction force, it is necessary to act on the motorized regulation valve 38, or counter-traction valve.

Figure 4:
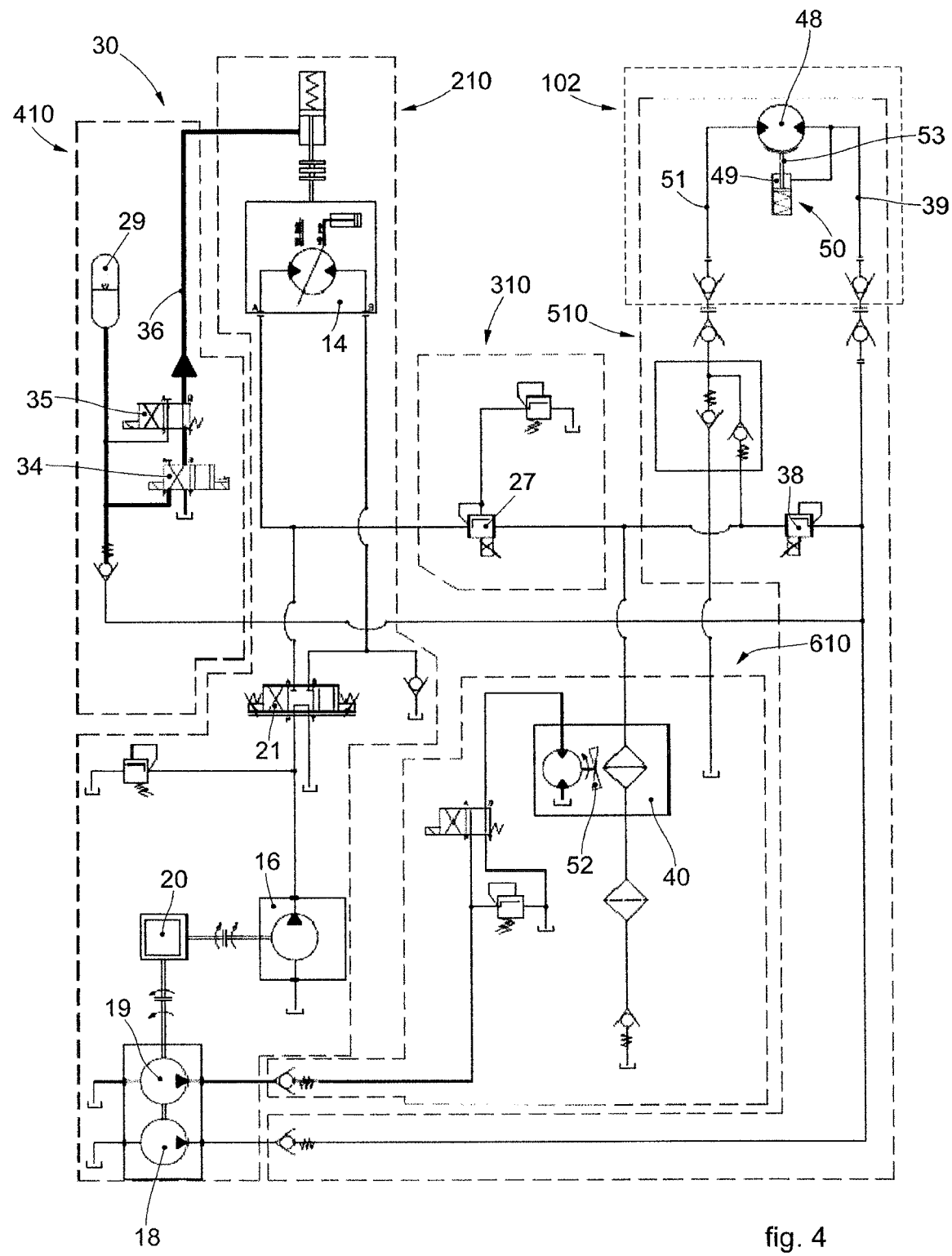
FIG. 4 is a schematic representation of the hydraulic circuit in an operating condition corresponding to the functioning of the apparatus as a brake and in the event of a breakdown of the hydraulic circuit.

If there is a malfunction in the hydraulic circuit, and hence a loss of pressure, the hydraulic circuit 30 behaves as in FIG. 4. The distributor valve 34 that opens the safety device 13 of the reduction unit remains switched as in the normal functioning as brake, therefore the safety device 13 remains open, preventing the immediate blockage of the capstans 12 thanks to the intervention of the accumulator 29, which sends work fluid to the branch 36 of the hydraulic circuit 30. The hydraulic motor 14 remains without work fluid and therefore idles, and the fan 52 of the radiator 40 stops functioning. Due to the hydraulic malfunction, as there is no longer any work fluid inside the hydraulic circuit 30, and in particular inside the branches 39 and 52 of the circuit associated with the hydraulic motor 48 and the actuator 73, the negative brake caliper 49 of the dynamic braking device 50 closes on the disc 53, generating a fixed resistance which causes a constant traction on the cable C. Substantially, due to the lack or drastic reduction of pressure in the hydraulic circuit 30, the calibrated springs provided in the actuator 73, with a counter-traction force determined during the design step and which was discussed earlier, close the jaws 70 and 71 provided with braking pads on the disc 53, which in short is integrated with the reel 11 in FIG. 1. The jaws 70 and 71 of the negative brake caliper 49 thus exert a dynamic braking on the disc 53 and hence on the reel 11, which will continue to rotate in a condition of dynamic braking for a certain period of time.

The control unit in this case switches off the diesel motor 20 so as to safeguard the pumps 16, 18 and 19. In this case too, a pressure value of the work fluid can be set, below which the control unit switches off the diesel motor 20: the pressure value can be 4 bar, for example. The constant counter-traction value generated by the negative brake caliper 49 of the dynamic braking device 50 on the disc 53 prevents the winding and unwinding unit 102 from stopping instantaneously. Indeed, an instantaneous stoppage would entail serious risks for the safety of the operators, as well as risks of damage to the cables and the apparatus. The laying apparatus 10 can therefore continue its laying operations for a predefined time, before it is stopped in safe conditions. The dynamic braking time can be two minutes, for example.

It is clear that modifications and/or additions of parts may be made to the winding and unwinding unit as described heretofore, without departing from the field and scope of the present invention.

It is also clear that, although the present invention has been described with reference to some specific examples, a person of skill in the art shall certainly be able to achieve many other equivalent forms of winding and unwinding unit for cable-laying machines, having the characteristics as set forth in the claims and hence all coming within the field of protection defined thereby.

What is claimed is:

1. A unit for winding and unwinding cables of a cable-laying apparatus provided with a hydraulic circuit, comprising:
    a reel, supporting the cables to be wound or unwound,
    a support frame, configured to keep the reel in a raised position with respect to the ground, and
    a rotation shaft, solid with the reel and associated with a corresponding hydraulic drive unit,
    at least a dynamic braking device, associated with the rotation shaft and configured to allow, according to a first operating mode, a normal rotation of the shaft and therefore of the reel for winding or unwinding the cables, and to exert on said shaft and therefore on the reel, according to another operating mode, a dynamic braking condition that allows the shaft to rotate in a braked configuration for at least a certain period of time and prevents the instantaneous stoppage of the rotation of the reel, the dynamic braking unit device comprising a negative brake caliper associated with at least a disc solid with the rotation shaft and configured, in case of malfunction of the hydraulic circuit, to close automatically on the disc, generating a fixed resistance which causes a constant traction on the cable, in which the unit for winding and unwinding cables comprises a regulation unit provided with a device to block the suction of the unit for winding and unwinding cables and a motorized counter-traction valve of the cables.

2. The unit as in claim 1, wherein the dynamic braking unit generates a counter-traction force on the shaft and therefore on the reel for the whole duration of the second operating mode.

3. The unit as in claim 2, wherein the counter-traction force is constant and fixed during a design stage.

4. The unit as in claim 2, wherein the counter-traction force varies between about 10% and about 40% of a maximum traction force exerted by the laying apparatus when functioning in a brake mode.

5. The unit as in claim 1, wherein the negative brake caliper comprises a pair of jaws configured to open or close on the disc and associated with a corresponding drive actuator.

6. The unit as in claim 5, wherein the drive actuator is associated with the hydraulic circuit with which the hydraulic drive unit is also associated.

7. The unit as in claim 5, wherein the jaws comprise braking pads configured to create a friction necessary to guarantee the dynamic braking and to dissipate a heat that derives from a pressure and from a rotation speed of the disc.

8. The unit as in claim 1, wherein the dynamic braking device comprises a manual calibration unit of the dynamic braking condition.

9. The unit as in claim 8, wherein the manual calibration unit comprises calibrated elastic elements.

10. A method to stop safely a unit of winding and unwinding cables according to claim 1, comprising:
    if there is a hydraulic breakdown of the hydraulic drive unit, providing a step of controlled stoppage of the unit for winding and unwinding cables by exerting a dynamic braking on the reel,
    generating, by the dynamic braking device, a counter-traction force on the cable for a determinate period of time, so that for the period of time the reel continues to rotate while being subject to dynamic braking applied by the dynamic braking device.

* * * * *